(12) United States Patent
Dubuc et al.

(10) Patent No.: US 10,075,457 B2
(45) Date of Patent: Sep. 11, 2018

(54) SANDBOXING PROTECTION FOR ENDPOINTS

(71) Applicant: Fortinet, Inc., Sunnyvale, CA (US)

(72) Inventors: Yannick Dubuc, Coquitlam (CA); Hai Liu, Burnaby (CA); Heng Du, Burnaby (CA); Yugang Du, Coquitlam (CA); Jonathan K. Seanor, Coquitlam (CA); Weining Wu, Surrey (CA); GangGang Zhang, Coquitlam (CA); Ronald Foo, Vancouver (CA)

(73) Assignee: Fortinet, Inc., Sunnyvale, CA (US)

( * ) Notice: Subject to any disclaimer, the term of this patent is extended or adjusted under 35 U.S.C. 154(b) by 163 days.

(21) Appl. No.: 15/085,640

(22) Filed: Mar. 30, 2016

(65) Prior Publication Data
US 2017/0289179 A1     Oct. 5, 2017

(51) Int. Cl.
*H04L 21/00*     (2006.01)
*H04L 29/06*     (2006.01)

(52) U.S. Cl.
CPC ...... *H04L 63/1416* (2013.01); *H04L 63/1425* (2013.01)

(58) Field of Classification Search
CPC .................. H04L 63/1416; H04L 63/1425
See application file for complete search history.

(56) References Cited

U.S. PATENT DOCUMENTS

| | | | | |
|---|---|---|---|---|
| 8,347,358 B2* | 1/2013 | Buch | ...................... | H04L 51/04 726/4 |
| 8,863,284 B1* | 10/2014 | Polyakov | .............. | H04L 63/145 726/22 |
| 9,332,023 B1* | 5/2016 | Wang | .................. | H04L 63/1416 |
| 2010/0083376 A1* | 4/2010 | Pereira | .................. | G06F 21/562 726/22 |
| 2016/0088005 A1* | 3/2016 | Sinnema | ................. | H04L 63/10 726/1 |

* cited by examiner

*Primary Examiner* — Morshed Mehedi
(74) *Attorney, Agent, or Firm* — Hamilton, DeSanctis & Cha LLP

(57) ABSTRACT

Methods and systems for integrating a sandboxing service and distributed threat intelligence within an endpoint security application are provided. According to one embodiment, The method includes file system or operating system activity relating to a file accessible to an endpoint system is monitored by an endpoint security application running on the endpoint system. The endpoint security application determines whether the file has been previously analyzed for a threat status. When a result of the determining is negative, then the endpoint security application requests the threat status by submitting the file to a remote threat analysis engine with a request to perform a threat analysis on the file. Based on the determined threat status, the endpoint security application selectively allows or disallows performance of the file system or operating system activity.

21 Claims, 5 Drawing Sheets

SANDBOXING PROTECTION FOR ENDPOINTS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2016, Fortinet, Inc.

BACKGROUND

Field

Embodiments of the present invention generally relate to endpoint security and sandboxing. In particular, embodiments of the present invention relate to linking a security application on endpoint devices to a sandboxing service available through a network.

Description of the Related Art

Computer and data security had become indispensable in an increasingly digital world. A cyber security breach may have a serious impact on individual users as well as businesses. Today, sophisticated malware are increasingly bypassing traditional security measures by masking their malicious nature in many ways—compression, encryption, polymorphism, and so forth. Advanced threats can evade straightforward detection, use previously unseen malware, exploit vulnerabilities, and come from new or seemingly unsuspicious sources.

Current approaches to dealing with these issues have proven ineffective. One common method of malware detection is through the use of system scans either initiated by the user or automatically scheduled on a periodic basis. During the scanning, the malware detector may search for traces of a virus or other malware using a database of known malware signatures. However, such databases must be routinely updated and have generally proven ineffective against subsequent variations of the virus. Another common approach to dealing with malicious software execution is real-time background system monitoring. Typically, this approach continuously monitors all incoming and outgoing files from the computer system in order to determine any association with known malicious software. Again, many of these approaches use a signature-based approach which is ineffective against subsequent variations of known malicious software. Further, use of sandboxing technology for threat protection has traditionally been done through monitoring and analyzing the traffic at the core of the network, e.g. wiretaps, firewalls, mail servers, and so forth. However, it is not always possible to catch all the content moving through the network before it reaches the endpoints because of encryption, polymorphism, and so forth and as deep packet inspection can be too onerous. Furthermore, some of the content is introduced to the endpoints via out-of-band channels (e.g., Universal Serial Bus (USB) storage) which is not visible to network security appliances within the core of the network.

It is therefore desirable to provide an efficient, comprehensive, pro-active, and integrated technique to address the above issues and provide enhanced security to endpoint systems.

SUMMARY

Methods and systems are described for providing a sandboxing service and distributed threat intelligence to endpoints. In one embodiment, a method of providing security to an endpoint system is disclosed. The method includes monitoring, by an endpoint security application running on an endpoint system within a protected network, file system or operating system activity relating to a file accessible to the endpoint system. The method further includes determining, by the endpoint security application, whether the file has been previously analyzed for a threat status of the file. When a result of said determining is negative, then the method further includes requesting, by the endpoint security application, the threat status by submitting the file to a remote threat analysis engine with a request to perform a threat analysis on the file; and receiving, by the endpoint security application, the threat status. The method further includes selectively allowing or disallowing, by the endpoint security application, performance of the file system or operating system activity based on the threat status.

In another embodiment, a system for providing security to an endpoint system is disclosed. The system includes at least one processor and a computer-readable medium communicatively coupled to the at least one processor. The computer-readable medium stores processor-executable instructions, which, on execution, cause the processor to monitor file system or operating system activity relating to a file accessible to the endpoint system via an endpoint security application running on an endpoint system within a protected network. The processor-executable instructions, on execution, further cause the processor to determine whether the file has been previously analyzed for a threat status of the file via the endpoint security application. When a result of said determining is negative, then the processor-executable instructions, on execution, further cause the processor to request the threat status by submitting the file to a remote threat analysis engine with a request to perform a threat analysis on the file via the endpoint security application and to receive the threat status via the endpoint security application. The processor-executable instructions, on execution, further cause the processor to selectively allow or disallow performance of the file system or operating system activity based on the threat status via the endpoint security application.

Additional aspects of the invention will be set forth in part in the description which follows, and in part will be obvious from the description, or may be learnt by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1A:
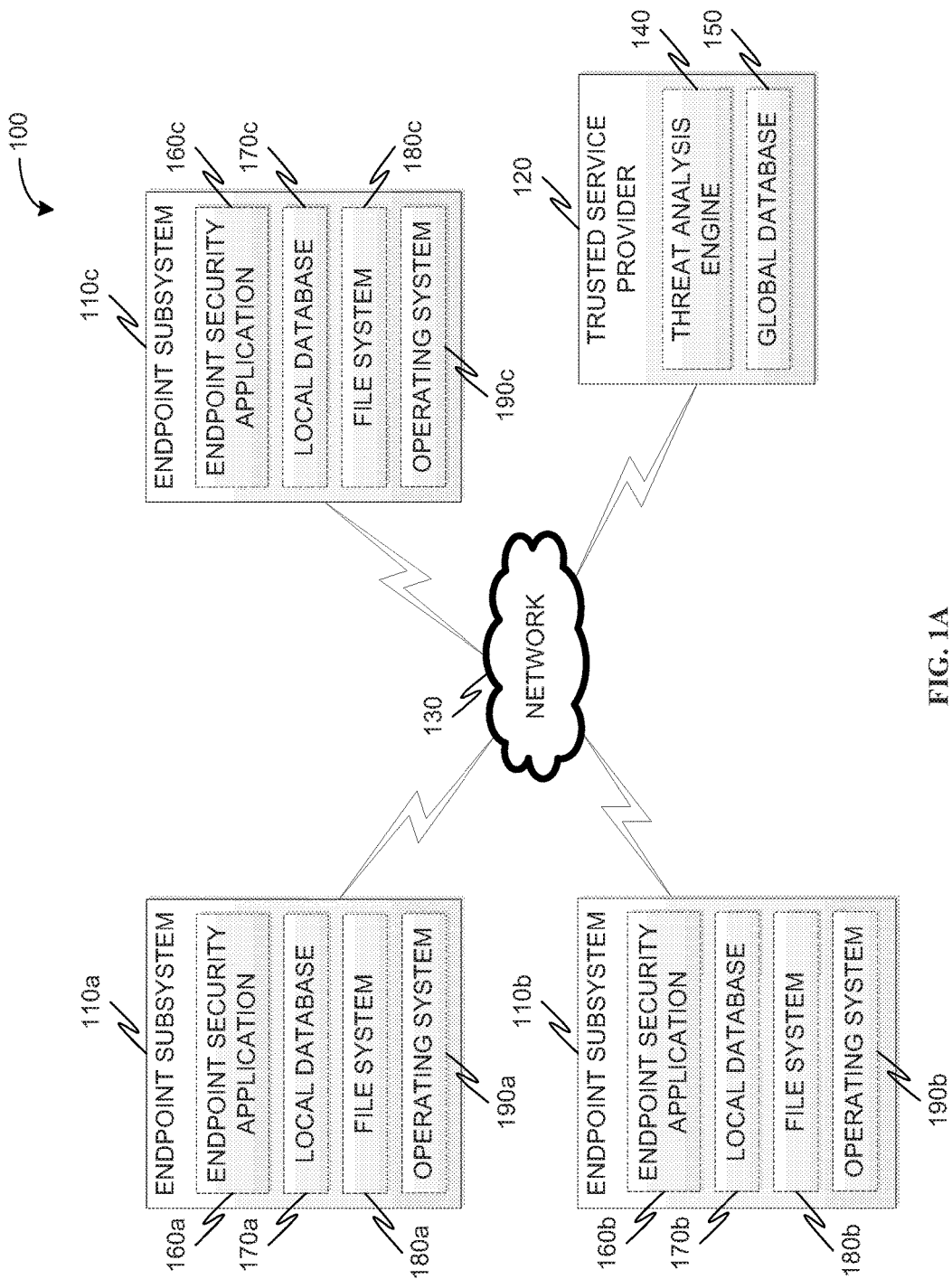
FIG. 1A is a block diagram illustrating an exemplary network environment in which various aspects of the present invention may be utilized.

Methods and systems are described for providing a sandboxing service and distributed threat intelligence to endpoints. In the following description, numerous specific details are set forth in order to provide a thorough understanding of embodiments of the present disclosure. It will be apparent to one skilled in the art that embodiments of the present disclosure may be practiced without some of these specific details.

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

The phrase "suspicious behavior" generally refers to behavior exhibited by a program that is indicative of potential malware. Non-limiting examples of suspicious behavior that rules of a heuristic engine may look for include:
- a program that attempts to access the registry, network or the file system;
- a program that attempts to copy itself into other programs (in other words, a classic computer virus);
- a program which attempts to write directly to the disk;
- a program that attempts to remain resident in memory after it has finished executing;
- a program that decrypts itself when run (a method often used by malware to avoid signature scanners);
- a program that binds to a TCP/IP port and listens for instructions over a network connection (this is pretty much what a bot—also sometimes called drones or zombies—do);

a program that attempts to manipulate (copy, delete, modify, rename, replace and so forth) files which are required by the operating system; and/or a program that is otherwise similar to programs already known to be malicious.

Those skilled in the art will appreciate some of the above-listed behaviors may be weighted heavier than others, meaning a match with one particular rule is more likely to indicate the presence of malicious software as are multiple matches based on other rules.

Referring to FIG. 1A, a block diagram of an exemplary network 100 in which various aspects of the present invention may be utilized is illustrated. The network environment 100 includes multiple endpoint systems 110 (e.g., endpoint system 110a, endpoint system 110b, endpoint system 110c, etc.) in communication with a trusted service provider 120 via a communication network 130. In some embodiments, endpoint systems 110a-c and trusted service provider 120 may form a part of a protected network (e.g., a network within an enterprise). Alternatively, in some embodiments, endpoint systems 110a-c may form a part of the protected network while trusted service provider 120 may be external to the protected network. Endpoint systems 110 may include, but are not limited to, personal computer(s), tablet computers, laptop computers, notebooks, server(s), fax machines, printers, scanners, various mobile devices such as cellular telephones, smartphones (e.g., Apple iPhone, Blackberry, Android-based phones, etc.), eBook readers (Amazon Kindle, Nook, etc.), gaming consoles (Microsoft Xbox, Nintendo DS, Sony PlayStation, etc.), or the like. Similarly, the trusted service provider 120 may include, but are not limited to, personal computer(s), tablet computers, laptop computers, notebooks, server(s), or the like. Each of endpoint systems 110a-c and trusted service provider 120 includes one or more processors and a computer-readable medium. The computer-readable medium 102 stores instructions that, when executed by the one or more processors 101, cause the one or more processors 101 to perform various functions in accordance with aspects of the present invention. An exemplary endpoint system or server of trusted service provider 120 is described in further detail below with reference to FIG. 4.

The communication network 130 may be a wired or a wireless communication network such as Internet, local area network (LAN), wide area network (WAN), and so forth. Each endpoint system 110a-c and the trusted service provider 120 may connect to the communication network 130 through a standard or high-speed network connection such as Ethernet LAN, cable modem, Digital Subscriber Line (DSL) or T1/T5 line. Further, endpoint systems 110a-c and trusted service provider 120 may communicate over communication network 130 using various wired and wireless communication protocols/methods. The communication protocols/methods may include, but are not limited to, direct connect, Ethernet (e.g., twisted pair 10/100/1000 Base T), transmission control protocol/internet protocol (TCP/IP), token ring, IEEE 802.11a/b/g/n/x, serial bus, universal serial bus (USB), infrared, PS/2, BNC, coaxial, component, composite, digital visual interface (DVI), high-definition multimedia interface (HDMI), RF antennas, S-Video, VGA, Bluetooth, cellular (e.g., code-division multiple access (CDMA), high-speed packet access (HSPA+), global system for mobile communications (GSM), long-term evolution (LTE), WiMax, or the like), etc. It should be noted that the transmission of information between endpoint systems 110a-c and trusted service provider 120 may be in real time or in batch mode.

Figure 1B:
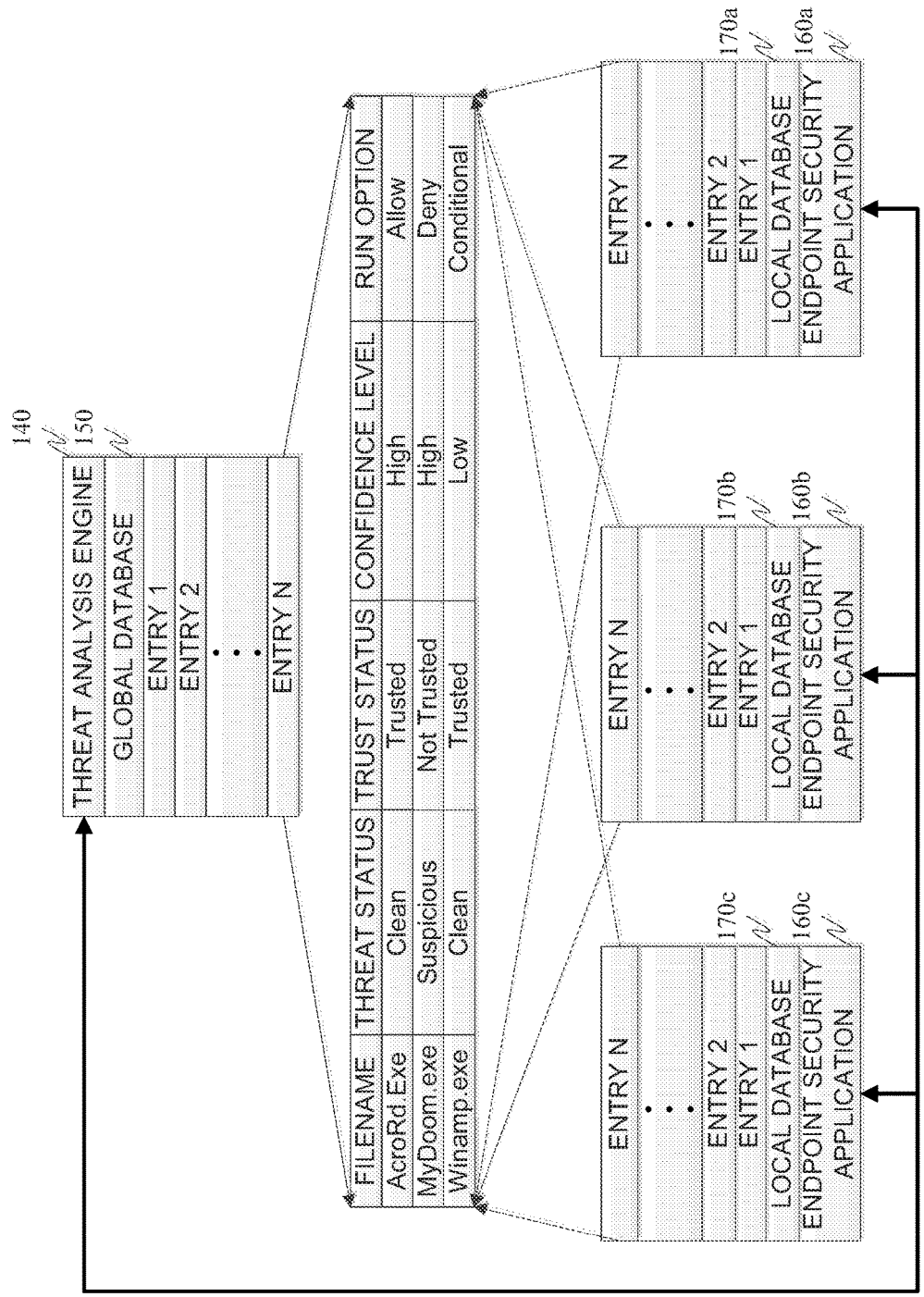
FIG. 1B conceptually illustrates an exemplary global database and exemplary local databases in accordance with an embodiment of the present invention.

Referring now to FIGS. 1A and 1B, trusted service provider 120 may generally include a threat analysis engine 140 to perform a threat analysis on one or more files received from one of endpoint systems 110a-c. As will be appreciated by those skilled in the art, the file may comprise an executable file (e.g., a Windows executable files, a Mac OS executable files or a Linux executable file) or an application specific file (e.g., a Portable Document Format (PDF) file or a Microsoft Office file). In some embodiments, such files may come from unverified third parties, suppliers, untrusted users, untrusted websites, etc. The threat analysis comprises analyzing the file in a contained environment to determine a threat status (e.g., suspicious or clean) of the file. In some embodiments, the threat status includes a trust status (e.g., trusted, not trusted or unknown) along with a confidence level (e.g., high, medium or low). The analysis in the contained environment ensures that if potentially destructive behavior or other security issues occur, those issues do not adversely impact the endpoint system, the network, or the user. In some embodiments, the threat analysis engine 140 performs sandboxing analysis on the one or more files. A non-limiting example of a threat analysis engine is the FortiSandbox family of advanced threat protection appliances available from Fortinet, Inc. of Sunnyvale, Calif., the assignee of the present invention. As will be appreciated by those skilled in the art, the sandboxing analysis comprises executing or opening a file in a separate, contained, and/or virtual environment identical to or similar to the actual endpoint environment and monitoring its behavior so as to determine a threat status based on the behavior. A file exhibiting suspicious or threatening behavior in the virtual environment is labelled as a threat. The suspicious behavior may include, but is not limited to, an attempt to access the registry, network, or the file system, an attempt to communicate on the network, an attempt to alter or overwrite system files, and detecting any other behaviors indicative of malware. Alternatively or additionally, other file inspection and/or analysis or heuristic techniques (e.g., code emulation, pattern matching (AV), etc.) may be employed by the threat analysis engine 140 for threat detection and analysis.

The threat analysis engine 140 is further configured to create, maintain, and access a global or a master database 150 of the trusted service provider 120. The global database 150 includes a list of multiple files (e.g., entry 1 to entry N) along with corresponding threat statuses based on threat analyses performed by trusted service provider 120 and is updated after each threat analysis. Additionally, in some embodiments, the threat analysis engine 140 may periodically generate a threat status report that may include threat status information for multiple files which were submitted to the threat analysis engine 140 by one or more of endpoint systems 110a-c. In some embodiments, the threat status report may include a list of multiple files submitted over a particular time period along with corresponding threat statuses. Moreover, in some embodiments, threat analysis engine 140 may periodically disseminate the threat status report to all endpoint systems 110a-c that are serviced by or subscribe to the sandbox service provided by trusted service provider 120.

Each of endpoint systems 110a-c may generally include an endpoint security application 160 (e.g., endpoint security application 160a, endpoint security application 160b, endpoint security application 160c, etc.). In some embodiments, the endpoint security application 160 may be an installable application provided by the trusted service provider 120 via a portable computer readable medium or over the network.

Thus, the endpoint security application 160 may be downloaded and installed on endpoint systems 110a-c by a user or a network administrator. The endpoint security application 160 executes or runs on a host endpoint system 110 and performs various functions to ensure security and to contain any threat to the host endpoint system 110. For example, the endpoint security application 160 monitors a file system or an operating system activity relating to a file on the endpoint system 110, determines a threat status of the file, and selectively allows or disallows performance of the file system or operating system activity based on the threat status. A non-limiting example of an endpoint security application is the FortiClient endpoint protection suite available from Fortinet, Inc. of Sunnyvale, Calif., the assignee of the present invention.

Each of the endpoint security application 160 is configured to create, maintain, and access a local database 170 (e.g., local database 170a, local database 170b, local database 170c, etc.) on the corresponding endpoint systems 110. Each of the local databases 170 includes a list of multiple files (e.g., entry 1 to entry M) along with corresponding threat statuses based on prior threat analyses performed by threat analysis engine 140. Further, each of the local databases 170 may be updated by their respective endpoint security application 160 upon receiving a request based threat status of a file or upon receiving a periodic threat status report from the trusted service provider 120. Further, each of the endpoint security applications 160a-c is configured to monitor or hook activity within a file system 180a-c and/or an operating system 190a-c on the corresponding endpoint system 110a-c to identify a file access by corresponding endpoint system 110a-c.

As noted above, endpoint security application 160a-c monitors and detects file system and/or operating system activity relating to a file accessible to endpoint system 110a-c. In some embodiments, endpoint security application 160a-c monitors file system or operating system activity relating to a file in real time by monitoring operating system process creation or module load activity. Further, in some embodiments, endpoint security application 160a-c may delay performance (e.g., interrupt the execution or loading of the file) of the file system or operating system activity until determination of the threat status of the file. In some embodiments, endpoint security application 160a-c determines the threat status of the file by accessing local database 170a-c and optionally by communicating with a remote threat analysis engine 140. In particular, endpoint security application 160a-c accesses local database 170a-c and determines whether the file has been previously analyzed by remote threat analysis engine 140 to determine its threat status. If the file has been previously analyzed and local database 170a-c is up-to-date, then information identifying the file (e.g., the filename and/or a cryptographic hash value, e.g., a Secure Hash Algorithm (e.g., SHA-1, SHA-256), Message Digest #5 (MD-5) or the like, computed over one or more portions or the entirety of the file) and the corresponding threat status will be present in local database 170a-c; otherwise, no entry corresponding to the file at issue will be present in local database 170a-c and the threat status for the file at issue can be determined by submitting the file to remote threat analysis engine 140 as part of a request to perform a threat analysis on the file. As noted above, in some embodiments, remote threat analysis engine 140 resides within trusted service provider 120 external to the protected network. Alternatively, in some embodiments, remote threat analysis engine 140 resides within a sandboxing service provided within the protected network.

Upon determining a threat status for the file locally or from remote threat analysis engine 140, endpoint security application 160a-c allows or disallows performance of the file system or operating system activity based on the threat status. In some embodiments, endpoint security application 160a-c further takes into consideration (e.g., optionally based on user or administrator defined security settings within endpoint security application 160a-c) the trust status and/or the confidence level of the trust status. In some embodiments, the user may define the security settings (e.g., high, medium, low, etc.) through endpoint security application 160a-c. For example, a file with high trust but a low confidence may be disallowed if the user defined security settings is set to be high while the same may be allowed if the user defined security settings is set to be low. Further, in some embodiments, endpoint security application 160a-c may disallow performance of the file system or operating system activity by denying access to the file and/or by quarantining the file when the threat status meets one or more specified criteria.

Figure 2:
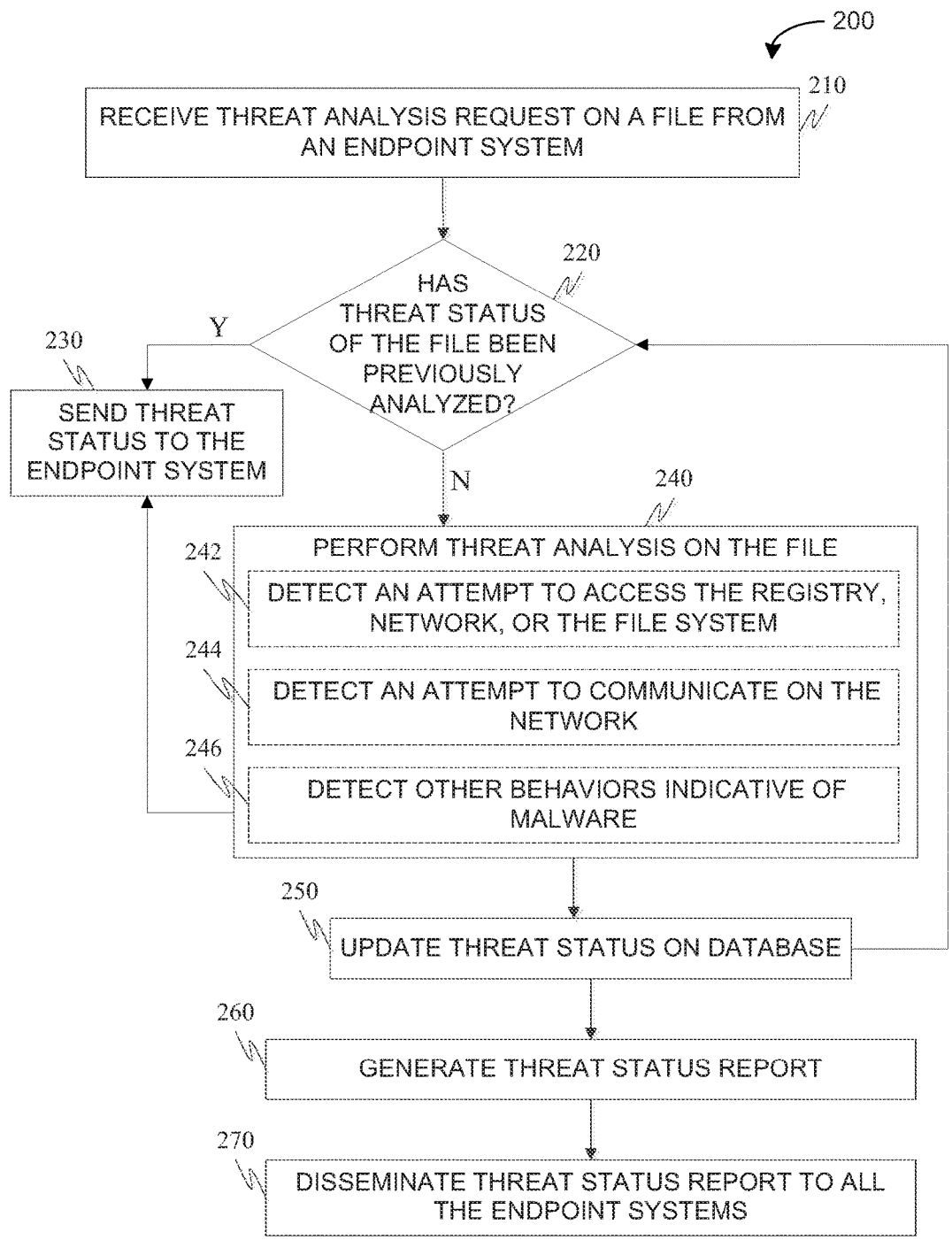
FIG. 2 is a flowchart illustrating sandboxing processing performed by a sandboxing service in accordance with an embodiment of the present invention.

Referring now to FIG. 2, a flowchart 200 for sandboxing processing performed by a sandboxing service is illustrated in accordance with an embodiment of the present invention. An endpoint security application running on an endpoint system within a protected network monitors file system or operating system activity relating to files accessible to the endpoint system. In certain scenarios, before the endpoint system is able to access (e.g., open or execute) the file, at step 210, a threat analysis engine receives a threat analysis request for the file from the endpoint security application running on the endpoint system. The file may be an executable file or an application specific file. Thereafter, at step 220, the threat analysis engine determines whether the file has been previously analyzed to determine a threat status of the file. The threat analysis engine accesses a global database maintained by it to make this determination. When a result of the determination made by the threat analysis engine is affirmative (e.g., the global database contains an entry matching the file at issue), then at step 230, the threat analysis engine sends the previously determined threat status to the requesting endpoint security application. The endpoint security application may update a local database maintained by it and may also selectively allow or disallow performance of the file system or operating system activity based on the received threat status. Alternatively, when a result of the determination made by the threat analysis engine is negative (e.g., the global database does not contain an entry matching the file at issue), then at step 240, the threat analysis engine performs a threat analysis on the file to determine a threat status of the file.

According to one embodiment, the threat analysis engine analyzes the file in a contained environment to determine the threat status of the file. In particular, the threat analysis engine performs sandboxing analysis (e.g., run-time heuristic analysis and/or emulation) on the file so as to determine behaviors exhibited by the file in the contained environment and to determine the threat status based on the observed behavior. At step 242, the threat analysis engine determines the behavior by, among other things, detecting a number and type of new processes started by the file, a number and type of new drivers started by the file, an attempt by the file or associated processes to access the registry, network, or the file system. Further, at step 244, the threat analysis engine determines the behavior by detecting an attempt to communicate on the network. Additionally, at step 246, the threat analysis engine determines the behavior by detecting any other suspicious behaviors indicative of malware. Thereafter, at step 230, the threat analysis engine 140 sends threat status to the endpoint security application running on the endpoint system. Additionally, at step 250, the threat analysis engine updates a global database maintained by it with information identifying the file (e.g., filename and/or hash) along with its determined threat status. Further, at step 260, the threat analysis engine may periodically generate a threat status report from the global database. The threat status report may include threat status information for multiple files submitted to the threat analysis engine 140 by multiple endpoint systems 110 over a particular time period. Moreover, at step 270, the threat analysis engine may disseminate threat status report to all the endpoint security applications running on the endpoint systems serviced by (or which subscribe to) threat analysis engine. Each of the endpoint security applications may then update their respective local database based on the threat status report received from the threat analysis engine.

Figure 3:
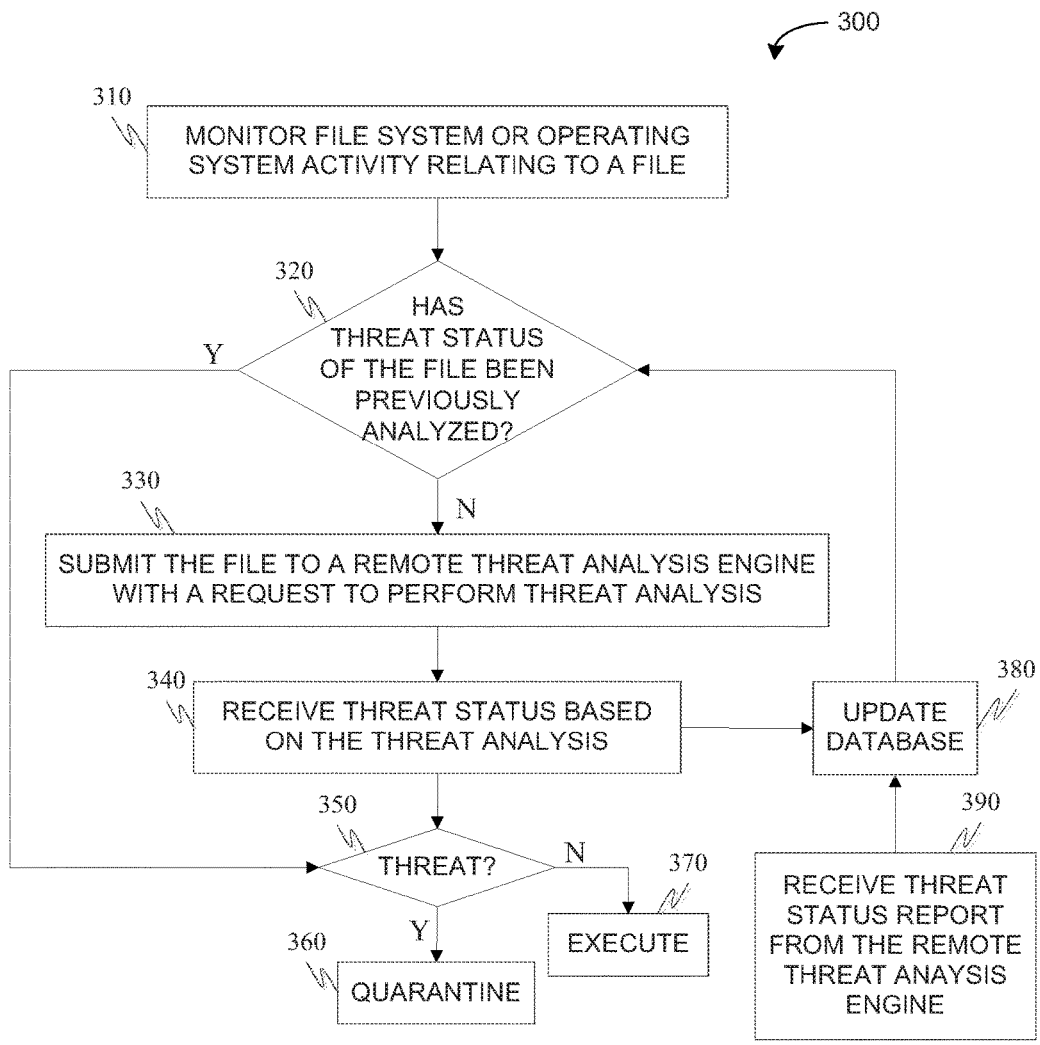
FIG. 3 is a flowchart illustrating endpoint security application processing in accordance with an embodiment of the present invention.

Referring now to FIG. 3, a flowchart 300 for processing performed by an endpoint security application is illustrated in accordance with an embodiment of the present invention. The processing triggers whenever an endpoint system attempts to access a file as determined by a kernel-level driver associated with the endpoint security application, for example, which intercepts or "hooks" certain system Application Programming Interface (API) calls in order to monitor one or more of the creation of processes prior to code execution and the loading of a code module into memory. A non-limiting example of monitoring for process creation activity in the context of the Windows operating system would be intercepting new process creation activity by hooking to the Windows CreateSection API call. Those skilled in the art will be aware of equivalent mechanisms in the context of other operating systems (e.g., Linux and the Mac OS).

In certain scenarios, before the endpoint system is able to access the file, at step 310, the endpoint security application running on the endpoint system within a protected network monitors, detects or is otherwise notified of file system or operating system activity relating to a file accessible to the endpoint system. The file may be an executable file or an application specific file. As described above, the endpoint security application may detect or be notified of the file system or operating system activity by monitoring or being called responsive to operating system process creation or module load activity, for example. Thereafter, at step 320, the endpoint security application determines whether the file has been previously analyzed and assigned a threat status. In one embodiment, the endpoint security application accesses a local database maintained by it to make this determination. When a result of the determination at step 320 made by the endpoint security application is negative, then at step 330, the endpoint security application requests the threat status of the file by submitting the file to a remote threat analysis engine with a request to perform a threat analysis on the file. Thereafter, at step 340, the endpoint security application receives the threat status of the file from the remote threat analysis engine. In some embodiments, the endpoint security application may also delay performance of the file system or operating system activity until determination of the threat status either locally or via a remote threat analysis engine. In some embodiments, the endpoint security application may also perform traditional static signature-based virus scanning on the file before or after determining the threat status from the local database or requesting the threat status from the remote threat analysis engine.

The endpoint security application may then selectively allow or disallow performance of the file system or operating system activity based on the threat status. Alternatively, when a result of the determination at step 320 made by the endpoint security application is affirmative, the endpoint security application may selectively allow or disallow performance of the file system or operating system activity based on the threat status. For example, at step 350, the endpoint security application determines whether the file is a threat or not. The determination at step 350 is based on the threat status (e.g., trust level and/or confidence level) and optionally based on user defined security settings. When a result of the determination at step 350 made by the endpoint security application is affirmative, then at step 360, the endpoint security application disallows performance of the file system or operating system activity. In some embodiments, disallowing performance includes denying access to the file and/or quarantining the file. Alternatively, when a result of the determination made by the endpoint security application is negative, then at step 370, the endpoint security application allows performance of the file system or operating system activity. In some embodiments, allowing performance includes granting access to the file and/or executing the file. Further, at step 380, the endpoint security application updates a local database maintained by it based on the threat status of the file received from the remote threat analysis engine. Additionally, at step 390, the endpoint security application may receive a periodic threat status report from the remote threat analysis engine. Responsive to receipt of the periodic threat status report, the endpoint security application may update its local database based on the threat status report.

Figure 4:
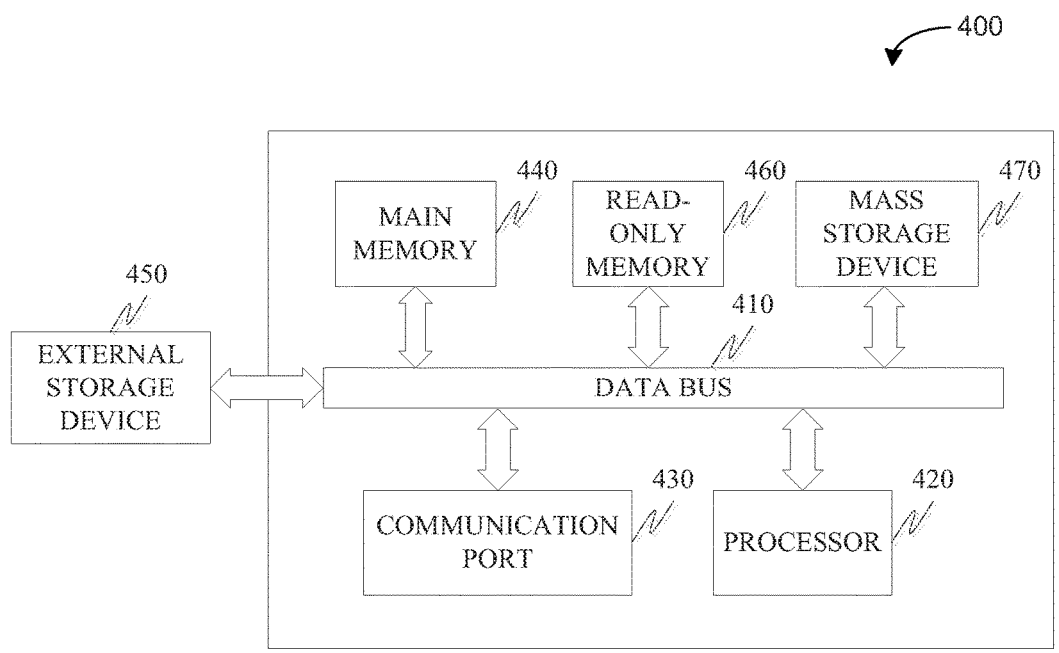
FIG. 4 is a block diagram of an exemplary computer system in which or with which embodiments of the present invention may be utilized.

As discussed above, embodiments of the present invention include various steps. A variety of these steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 4 illustrates an exemplary a computer system 400, such as an endpoint system (e.g., endpoint system 110a-c) or a server within a trusted service provider (e.g., trusted service provider 120), in which or with which embodiments of the present invention may be utilized.

According to the present example, the computer system includes a data bus 410, at least one processor 420, at least one communication port 430, a main memory 440, a removable storage media 450, a read only memory 460, and a mass storage 470. Processor(s) 420 can be any know processor, such as, but not limited to, an Intel® Itanium® or Itanium 2® processor(s), or AMD® Opteron® or Athlon MP® processor(s), or Motorola® lines of processors. Communication port(s) 430 can be any of an RS-232 port for use with a modem based dialup connection, a 10/100 Ethernet port, or a Gigabit port using copper or fiber. Communication port(s) 430 may be chosen depending on a network such a Local Area Network (LAN), Wide Area Network (WAN), or any network to which the computer system 400 connects.

Main memory 440 can be Random Access Memory (RAM), or any other dynamic storage device(s) commonly known in the art. Read only memory 460 can be any static storage device(s) such as Programmable Read Only Memory (PROM) chips for storing static information such as instructions for processor 420. Mass storage 470 can be used to store information and instructions. For example, hard disks such as the Adaptec® family of SCSI drives, an optical disc, an array of disks such as RAID, such as the Adaptec family of RAID drives, or any other mass storage devices may be used. Data bus 410 communicatively couples processor(s) 420 with the other memory, storage and communication blocks. Data bus 410 can be a PCI/PCI-X or SCSI based system bus depending on the storage devices used. Removable storage media 450 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

The components described above are meant to exemplify some types of possibilities. In no way should the aforementioned examples limit the scope of the invention, as they are only exemplary embodiments.

Various embodiments of the present invention provide methods and systems for providing efficient and comprehensive security to endpoint systems in a network by linking a security application on endpoint devices to a threat analysis and detection service available through the network. The service pro-actively detects file system activity and/or operating system activity relating to a file on an endpoint system, and triggers determination of threat associated with the file via an endpoint security application. The determination may be performed locally or through submission of files to the service provider. Further, the service selectively allows or disallows performance of the file system or operating system activity based on the determined threat status. Thus, the service ensures security even from files introduced to the endpoint systems via out-of-band channels. Additionally, the service enables intelligence gathered from one endpoint system to benefit all the other endpoints on the network.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, to avoid obscuring the present invention.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "computing", "comparing", "determining", "adjusting", "applying", "creating", "ranking," "classifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain embodiments of the present invention also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

It is to be understood that the above description is intended to be illustrative, and not restrictive. Many other embodiments will be apparent to those of skill in the art upon reading and understanding the above description. The scope of the invention should therefore be determined with reference to the appended claims, along with the full scope of equivalents to which such claims are entitled.

What is claimed is:

1. A method comprising:
monitoring, by an endpoint security application running on an endpoint system within a protected network, file system or operating system activity relating to a file accessible to the endpoint system;
determining, by the endpoint security application, whether the file has been previously analyzed for a threat status of the file;
when a result of said determining is negative, then
requesting, by the endpoint security application, the threat status by submitting the file to a remote threat analysis engine with a request to perform a threat analysis on the file, wherein the threat status is determined at least in part by the remote threat analysis engine performing a sandboxing analysis on the file, wherein the sandboxing analysis includes executing the file in a contained environment similar in nature to that of the endpoint system and identifying suspicious behavior exhibited by the file indicative of potential malware by:
monitoring a number and type of processes started by the file;
monitoring a number and type of drivers started by the file;
observing whether an attempt is made by the file or the processes to access a registry, a network or a file system;
observing whether an attempt is made by the file or the processes to copy itself into other programs;
observing whether an attempt is made by the file or the processes to write directly to a hard disk;
observing whether an attempt is made by the file or the processes to remain resident in memory after it has finished executing;
observing whether an attempt is made by the file to decrypt itself responsive to the execution; and
observing whether an attempt is made by the file or the processes to manipulate one or more operating system files;
receiving, by the endpoint security application, the threat status; and
selectively allowing or disallowing, by the endpoint security application, performance of the file system or operating system activity based on the threat status.

2. The method of claim 1, wherein the file comprises an executable file or an application specific file.

3. The method of claim 1, wherein said monitoring, by an endpoint security application running on an endpoint system, file system or operating system activity relating to a file comprises the endpoint security application monitoring operating system process creation or module load activity.

4. The method of claim 3, further comprising delaying, by the endpoint security application, performance of the file system or operating system activity until receipt of the threat status from the remote threat analysis engine.

5. The method of claim 1, wherein the remote threat analysis engine resides within a trusted service provider external to the protected network.

6. The method of claim 1, wherein the remote threat analysis engine resides within a sandboxing service within the protected network.

7. The method of claim 1, wherein the remote threat analysis engine provides sandboxing analysis for a plurality of other endpoint systems within the protected network.

8. The method of claim 1, wherein said determining, by the endpoint security application, whether the file has been previously analyzed for a threat status of the file comprises accessing a database maintained on the endpoint system, the database comprising a list of a plurality of files along with a plurality of corresponding threat statuses based on a plurality of prior threat analyses performed by the remote threat analysis engine.

9. The method of claim 8, further comprising updating, by the endpoint security application, the database based on a threat status report received from the remote threat analysis engine, the threat status report containing therein threat status information for multiple files, which were submitted to the remote threat analysis engine by a plurality of endpoint systems within the protected network.

10. The method of claim 1, wherein the threat analysis comprises analyzing the digital content in a contained environment to determine the threat status.

11. The method of claim 1, wherein the threat status comprises a trust status along with a confidence level.

12. The method of claim 1, wherein said selectively allowing or disallowing, by the endpoint security application, performance of the file system or operating system activity based on the threat status comprises denying access to the file and quarantining the file when the threat status meets one or more specified criteria.

13. An endpoint system associated with a protected network, the endpoint system comprising:
at least one processor; and
a non-transitory computer-readable medium storing instructions representing an endpoint security application, which when executed by the at least one processor, cause the at least one processor to perform a method comprising:
monitoring file system or operating system activity relating to a file accessible to the endpoint system;
determining whether the file has been previously analyzed for a threat status of the file;
when a result of said determining is negative, then
requesting the threat status by submitting the file to a remote threat analysis engine with a request to perform a threat analysis on the file, wherein the threat status is determined at least in part by the remote threat analysis engine performing a sandboxing analysis on the file, wherein the sandboxing analysis includes executing the file in a contained environment similar in nature to that of the endpoint system and identifying suspicious behavior exhibited by the file indicative of potential malware by:
monitoring a number and type of processes started by the file;
monitoring a number and type of drivers started by the file;
observing whether an attempt is made by the file or the processes to access a registry, a network or a file system;
observing whether an attempt is made by the file or the processes to copy itself into other programs;
observing whether an attempt is made by the file or the processes to write directly to a hard disk;

observing whether an attempt is made by the file or the processes to remain resident in memory after it has finished executing;

observing whether an attempt is made by the file to decrypt itself responsive to the execution; and observing whether an attempt is made by the file or the processes to manipulate one or more operating system files;

receiving the threat status; and selectively allowing or disallowing performance of the file system or operating system activity based on the threat status.

14. The endpoint system of claim 13, wherein said monitoring comprises monitoring, by the endpoint security application, operating system process creation or module load activity.

15. The endpoint system of claim 14, wherein the method further comprises delaying, by the endpoint security application, performance of the file system or operating system activity until receipt of the threat status from the remote threat analysis engine.

16. The endpoint system of claim 13, wherein the remote threat analysis engine resides within at least one of a trusted service provider external to the protected network, and a sandboxing service within the protected network.

17. The endpoint system of claim 13, wherein the remote threat analysis engine provides sandboxing analysis for a plurality of other endpoint systems within the protected network.

18. The endpoint system of claim 13, wherein said determining comprises accessing, by the endpoint security application, a database maintained on the endpoint system, the database comprising a list of a plurality of files along with a plurality of corresponding threat statuses based on a plurality of prior threat analyses performed by the remote threat analysis engine.

19. The endpoint system of claim 18, wherein the method further comprises updating, by the endpoint security application, the database based on a threat status report received from the remote threat analysis engine, the threat status report containing therein threat status information for multiple files, which were submitted to the remote threat analysis engine by a plurality of endpoint systems within the protected network.

20. The endpoint system of claim 13, wherein the threat analysis comprises analyzing the file system or operating system activity in a contained environment to determine the threat status, and wherein the threat status comprises a trust status along with a confidence level.

21. The endpoint system of claim 13, wherein said selectively allowing or disallowing comprises denying, by the endpoint security application, access to the file and quarantining, by the endpoint security application, the file when the threat status meets one or more specified criteria.

* * * * *